(12) United States Patent
Densel et al.

(10) Patent No.: US 7,192,062 B2
(45) Date of Patent: Mar. 20, 2007

(54) QUICK CONNECT CARTRIDGE ASSEMBLY WITH PLUG

(75) Inventors: David S. Densel, Whitehouse, OH (US); Steven D. Haubert, Sylvania, OH (US); Darwin C. Olson, Perrysburg, OH (US); Philip C. Van Riper, Holland, OH (US); Loren H. Uthoff, Jr., Columbia Station, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/003,266

(22) Filed: Dec. 3, 2004

(65) Prior Publication Data

US 2005/0121909 A1 Jun. 9, 2005

Related U.S. Application Data

(60) Provisional application No. 60/526,778, filed on Dec. 4, 2003.

(51) Int. Cl.
*F16L 35/00* (2006.01)

(52) U.S. Cl. .................. 285/39; 285/322; 285/136.1; 285/23

(58) Field of Classification Search ............... 285/217, 285/214, 23, 39, 322, 323; 138/89, 90
See application file for complete search history.

(56) References Cited

U.S. PATENT DOCUMENTS

| | | | |
|---|---|---|---|
| 5,287,892 A | 2/1994 | Sanderson et al. | |
| 5,429,394 A | 7/1995 | Olson | |
| 5,636,662 A | 6/1997 | Olson | |
| 5,911,443 A | 6/1999 | Le Quere | |

*Primary Examiner*—Aaron Dunwoody
(74) *Attorney, Agent, or Firm*—Benesch, Friedlander, Coplan & Aronoff LLP

(57) ABSTRACT

A quick-connect cartridge assembly includes a ring, a collar disposed within the ring, and an annular seal coaxially disposed with respect to the ring and the collar. A plug having a shank with an outer diameter substantially similar to the inner diameter of the collar is slidably received within the collar and is held within the collar by a friction fit. The plug is also received through the annular seal so as to establish a coaxial relationship with the ring, the collar and the annular seal. The plug includes one or more features for facilitating installation of the ring, the collar and the annular seal into a port and subsequent removal of the plug from the components after installation.

20 Claims, 8 Drawing Sheets

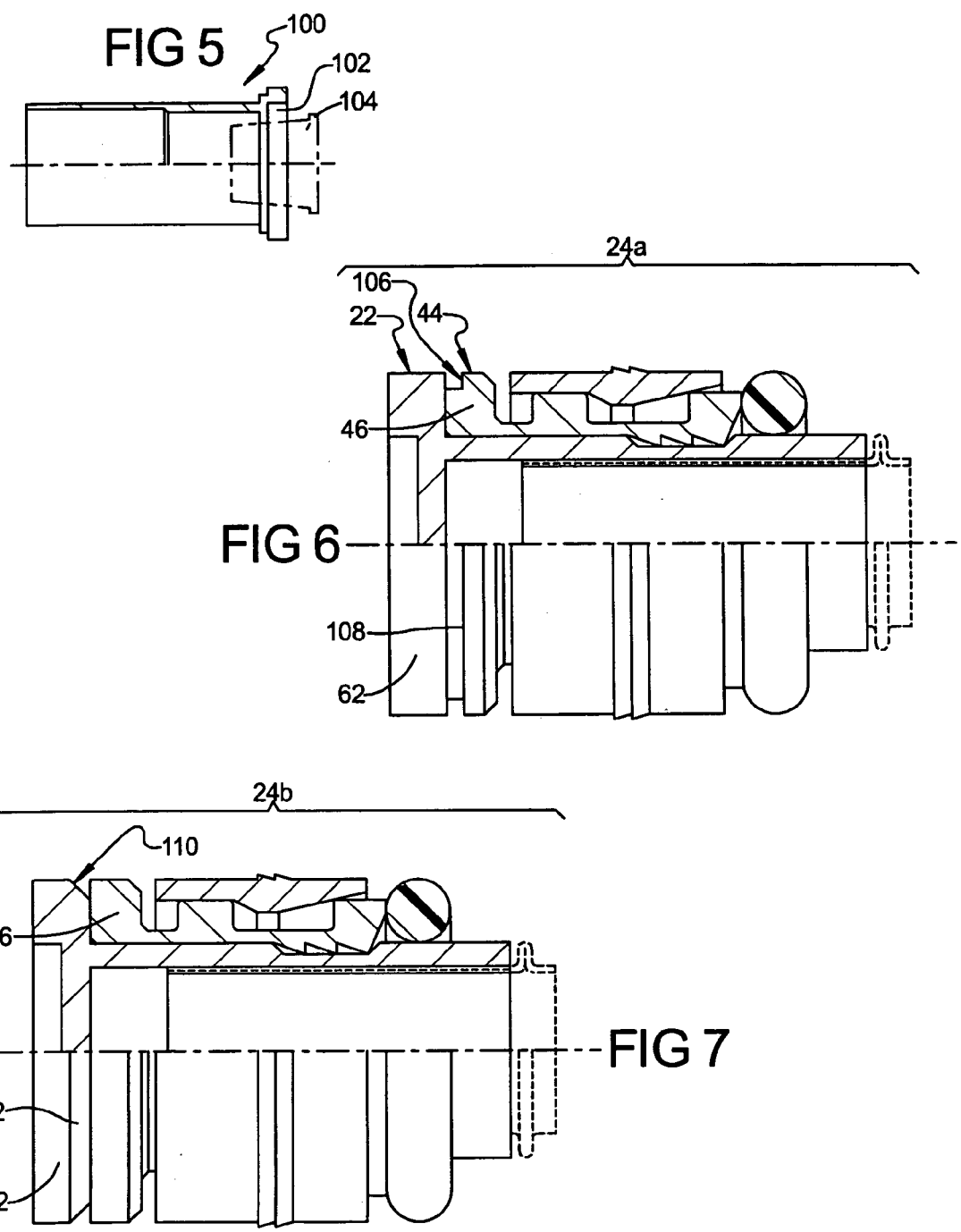

FIG 8
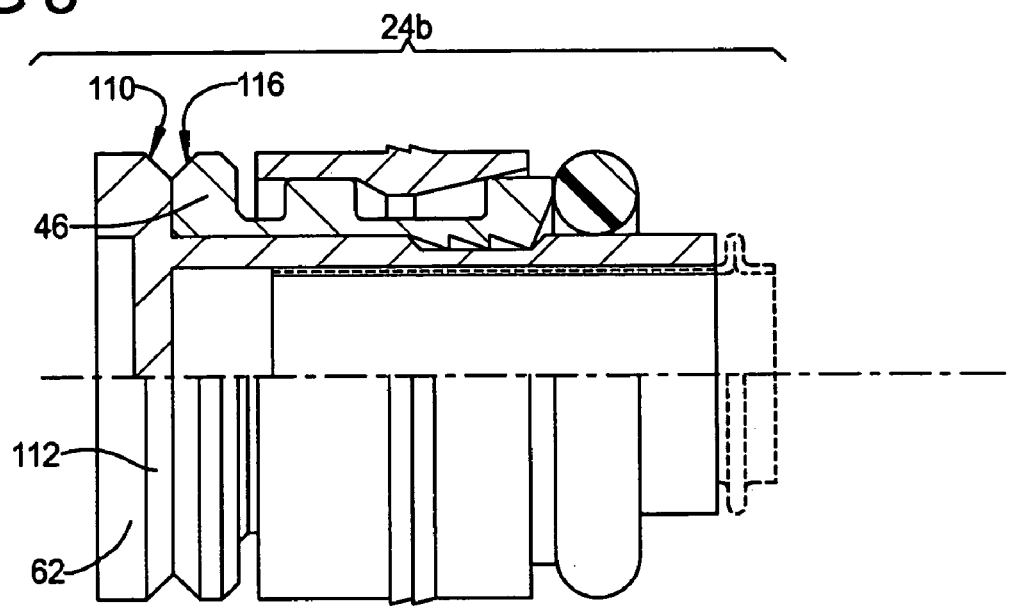
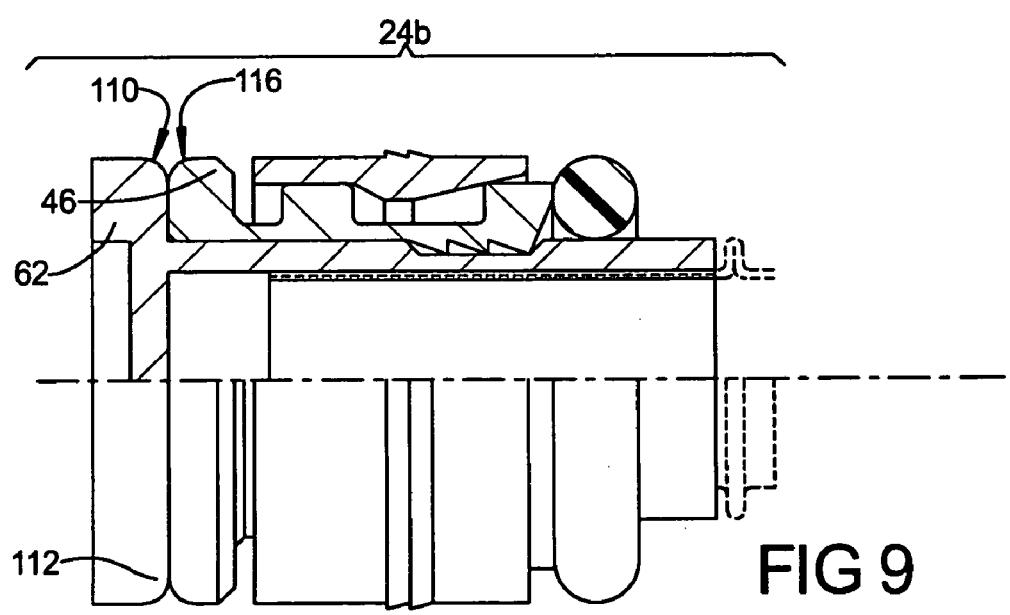
FIG 9

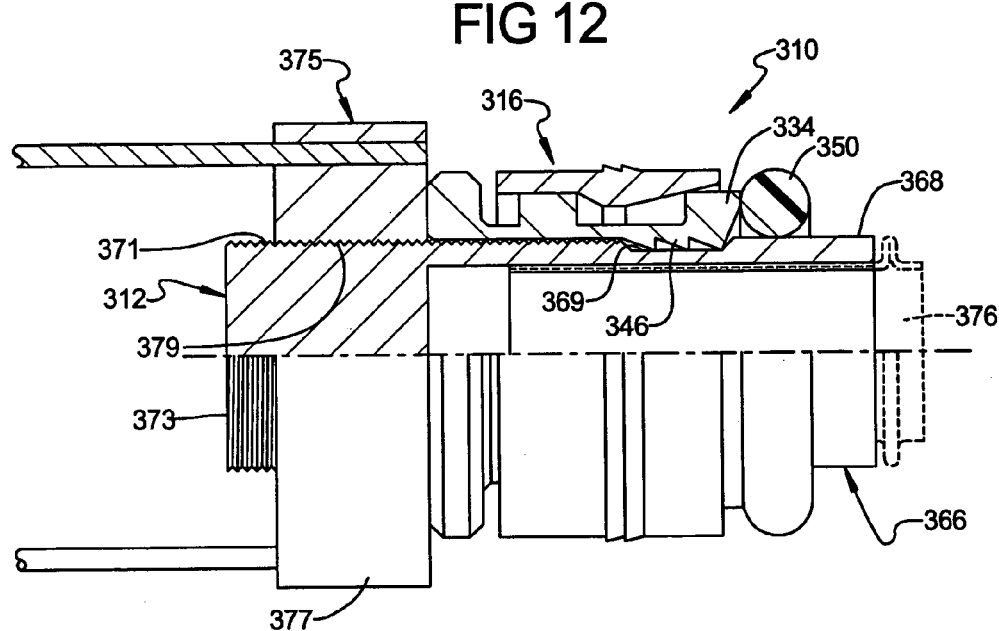

QUICK CONNECT CARTRIDGE ASSEMBLY WITH PLUG

RELATED APPLICATIONS

This application claims priority to U.S. Provisional Patent application Ser. No. 60/526,778 filed on Dec. 4, 2003, the disclosure of which is incorporated by reference herein in its entirety.

BACKGROUND OF THE INVENTION

1. Field of the Invention

The present invention relates to a quick-connect cartridge assembly that includes a plug.

2. Description of the Related Art

Fittings, valves and manifolds, such as those used to control air brakes on trucks, are mounted in valve fittings or manifold bodies that have ports for connecting fluid lines thereto. To minimize manufacturing expense, reduce assembly errors and expedite assembly, the fluid lines are typically coupled to the ports utilizing what are referred to as "quick-connect cartridges." In the truck manufacturing industry, these couplings are commonly referred to as "air brake quick-connect cartridges." These couplings allow an assembler to make connections in air brake systems by simply pushing the connector of a fluid line into the quick-connect cartridge after the cartridge has been mounted within a port of a valve or fitting manifold.

In one known quick-connect cartridge design, the components of the cartridge are mounted on a plug. The plug is used as a shipping pin and is also used to install the components into a port of a valve or fitting manifold. The plug may then be removed from the installed cartridge components or retained in the installed components until a fluid line is coupled to the port. While this design has proven effective in practice, coupling designers continue to develop improvements in these types of couplings to further minimize manufacturing expense, reduce assembly errors and expedite assembly of the components into a port and removal of the plug from the components.

SUMMARY OF THE INVENTION

A quick-connect cartridge assembly is provided that includes a ring, a collar disposed within the ring, an annular seal coaxially disposed with respect to the ring and the collar, and a plug. In an embodiment, the plug includes a shank with an outer diameter substantially similar to the inner diameter of the collar. The shank is slidably received within the collar and is held within the collar by a friction fit. The plug is also received through the annular seal so as to establish a coaxial relationship with the ring, the collar and the annular seal. The plug includes an end flange thereon for abutting the collar when the plug is inserted. The end flange facilitates driving of the ring, the collar and the annular seal into a port. The plug and the collar are configured to permit a predetermined degree of axial movement therebetween when the plug is received in the collar such that a gap is created between the collar and the end flange of the plug for insertion of a release tool to withdrawal the plug from the ring, the collar and the annular seal when mounted in the port.

In another embodiment of the invention, a quick-connect cartridge assembly is provided that includes a ring, a collar including a flange having a portion adapted to receive a release tool, an annular seal coaxially disposed with respect to the ring and the collar, and a plug. The plug includes a shank with an outer diameter substantially similar to an inner diameter of the collar, wherein the shank of the plug is slidably received within the collar and is held within the collar by a friction fit. The plug is also received through the annular seal so as to establish a coaxial relationship with the ring, the collar and the annular seal. The plug includes an end flange thereon for abutting the collar when the plug is inserted. The end flange facilitates driving of the ring, the collar and the annular seal into a port and withdrawal of the plug from the ring, the collar and the annular seal after mounting in the port.

In another embodiment of the invention, a quick-connect cartridge assembly is provided that includes a ring, a collar integral with the ring, an annular seal coaxially disposed with respect to the ring and the collar, and a plug. The plug includes a shank with an outer diameter substantially similar to the inner diameter of the collar. The shank of the plug is slidably received within the collar and is held within the collar by a friction fit. The plug is also received through the annular seal so as to establish a coaxial relationship with the ring, the collar and the annular seal. The plug includes an end flange thereon for abutting the collar when the plug is inserted. The end flange facilitates driving the ring, the collar and the annular seal into a port and withdrawal of the plug from the ring, the collar and the annular seal after mounting in the port.

In another embodiment of the invention, a quick-connect cartridge assembly is provided that includes a ring, a collar disposed within the ring, an annular seal coaxially disposed with respect to the ring and the collar, and a plug. The plug includes a shank with an outer diameter substantially similar to the inner diameter of the collar. The shank of the plug is slidably received within the collar and is held within the collar by a friction fit. The plug is also received through the annular seal so as to establish a coaxial relationship with the ring, the collar and the annular seal. The plug includes an exterior surface having at least one thread. A tool is configured to engage the plug and to withdraw the plug from the ring, the collar and the annular seal after the ring, the collar and the annular seal have been received in a port.

BRIEF DESCRIPTION OF THE DRAWINGS

Embodiments of the invention will now be described, by way of example, with reference to the accompanying drawings, wherein:

FIG. 5 is a cross-sectional view of another embodiment of the plug;

FIG. 6 is a partial cross-sectional view of a quick-connect cartridge assembly according to another embodiment of the invention;

FIG. 7 is a partial cross-sectional view of a quick-connect cartridge assembly according to another embodiment of the invention;

FIG. 8 is a partial cross-sectional view of a quick-connect cartridge assembly according to another embodiment of the invention;

FIG. 9 is a partial cross-sectional view of a quick-connect cartridge assembly according to another embodiment of the invention;

FIG. 12 is a partial cross-sectional view of a quick-connect cartridge assembly according to another embodiment of the invention;

FIG. 13 is a cross-sectional view of the assembly of FIG. 12 shown during removal of the plug;

DETAILED DESCRIPTION

Figure 1:
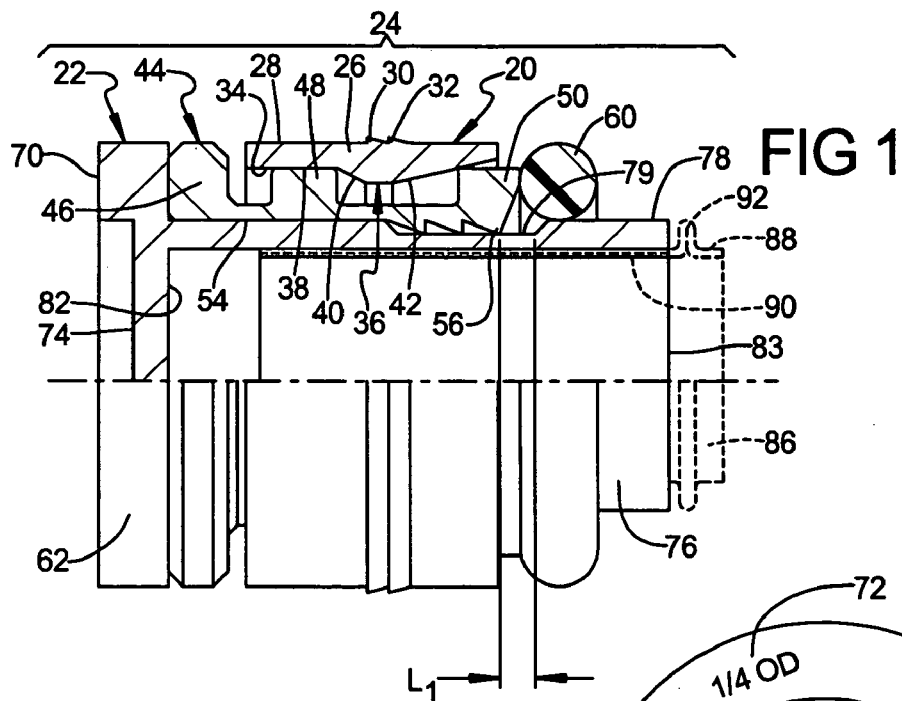
FIG. 1 is a partial cross-sectional view of a quick-connect cartridge assembly according to an embodiment of the invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Referring now to FIG. 1, there is shown a cartridge subassembly 20 with a plug 22 according to an embodiment of the invention, which cooperatively forms a cartridge assembly 24. Cartridge subassembly 20 includes an outer ring 26, such as a brass ring, having an outer surface 28 with a pair of externally facing annular barbs 30 and 32 thereon. Ring 26 has an inner cylindrical surface 34 with an inner annular rib 36. Inner surface 34 includes a front surface 38, which is generally cylindrical, an intermediate frustoconical surface 40 rising to the rib 36, and a rear frustoconical surface 42 that tapers away from the rib 36 in the opposite direction.

Ring 26 retains a collar 44 mounted coaxially therein. Collar 44 includes front flange 46, an intermediate shoulder 48 and a rear shoulder 50. Intermediate shoulder 48 engages the front, inner cylindrical surface 38 of ring 26, while the rear shoulder 50 engages the rear conical surface 42 of the ring with rib 36 being received in a space defined between intermediate shoulder 48 and rear shoulder 50. Collar 44 has a cylindrical inner surface 54, which has teeth or barbs 56 facing inwardly. Collar 44 may also be made from brass; however, collar 44 is not intended to be limited thereto.

Proximate ring 26 and collar 44 is a resilient annular seal 60, such as an O-ring, which abuts rear shoulder 50 of collar 44. Annular seal 60 has an outer diameter substantially equal to the outer diameter of ring 26 and an inner diameter substantially equal to the inner diameter of collar 44. Ring 26, collar 44 and annular seal 60 cooperate to provide a quick-connect cartridge, such as an air brake quick-connect cartridge, when inserted into a housing of a manifold, fitting or valve (see, e.g., FIG. 3).

In an embodiment of the invention, ring 26, collar 44 and annular seal 60 are mounted on plug 22. Plug 22 may be made of a resinous material and may be glass filled for reinforcement. In an exemplary implementation, plug 22 is made of CAPRON 8231 which is 12% glass filled. In an embodiment, plug 22 includes an end flange 62 that abuts the end flange 46 of collar 44. Unlike some prior art quick-connect coupling assemblies, flange 62 does not include or require a step with a radial surface for connecting to a tool.

Figure 2:
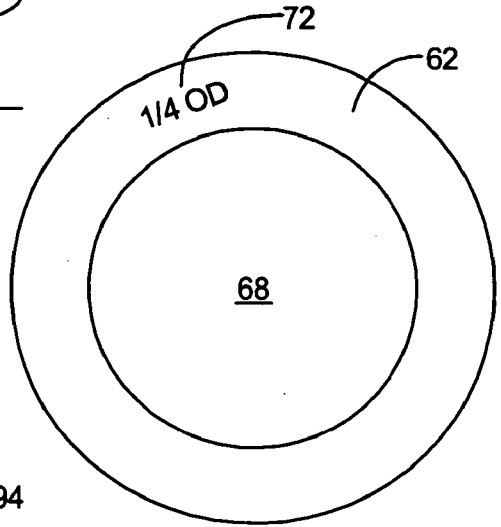
FIG. 2 is an end view of the assembly shown in FIG. 1.

With reference to FIG. 2, plug 22 may include an end face 68 with an annular, raised portion 70 having indicia 72 thereon that identifies the plug and identifies its diameter. For example, if collar 44 of cartridge subassembly 20 has an inside diameter of ¼ inch, so as to receive a ¼ inch coupling of outside diameter, then flange 62 is marked with indicia 72 that says "¼ O.D.". Plug 22 may also include a cavity 74 surrounded by raised portion 70, which serves to assist in locating a punch or other tool used to drive plug 22 and cartridge subassembly 20 during insertion into a port of a manifold or valve. Cavity 74 may be generally round, as shown in FIG. 2, or another geometric shape, such as a rectangle.

Figure 4A:
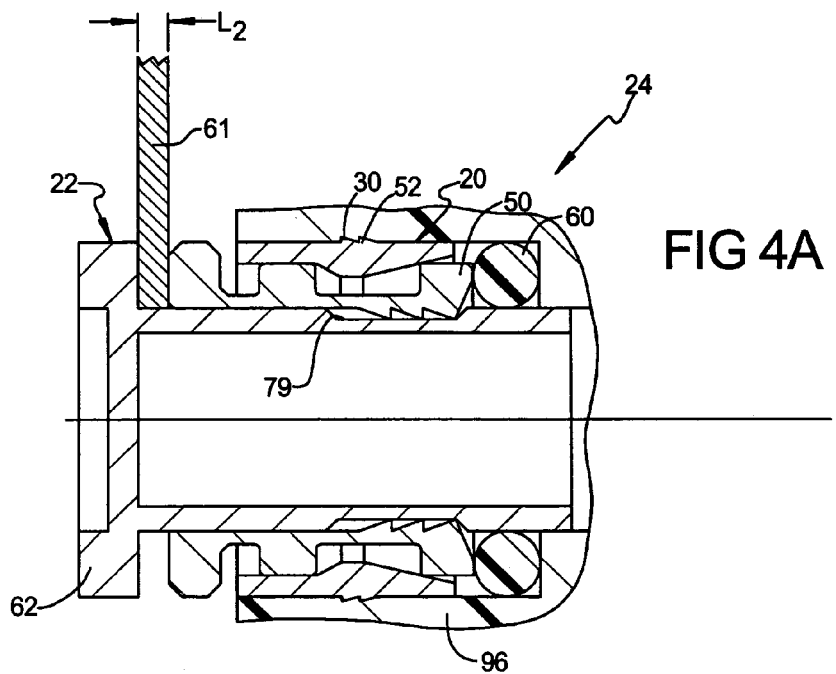
FIG. 4A is a cross-section view of FIG. 3, showing the plug during removal from the assembly.

In a particular configuration, plug 22 includes a tubular shank portion 76 having an outer surface 78 that force fits into collar 44. Shank 76 is held within collar 44 by barbs 56, which extend inwardly from collar 44 and are received into a groove 79 projecting inwardly from outer surface 78 of shank 76. Unlike some prior art quick-connect coupling assemblies, groove 79 is significantly longer than the length of barbs 56, which allows a limited degree of axial movement of plug 22 within collar 44. As will be described in further detail below, the limited axial movement of plug 22 allowed by groove 79 permits a tool 61 (see FIG. 4A) to be inserted between flange 62 on plug 22 and flange 46 on collar 44 to facilitate removal of plug 22.

In the embodiment of FIG. 1, an end wall 82 encloses an end of the tubular shank 76. At its other end 83, tubular shank 76 is open. In accordance with an embodiment of the invention, open end 83 is adapted to receive an optional tube support (dotted lines) 86 therein. Tube support 86 has a larger diameter portion 88 and a smaller diameter end portion 90 with the smaller diameter end portion being received within shank 76 and held therein by one or more ribs. The larger diameter end 88 is joined to the smaller diameter portion 90 by a substantially U-shaped fold 92 that is juxtaposed with the flat radial end surface 83 of shank 76.

Figure 3:
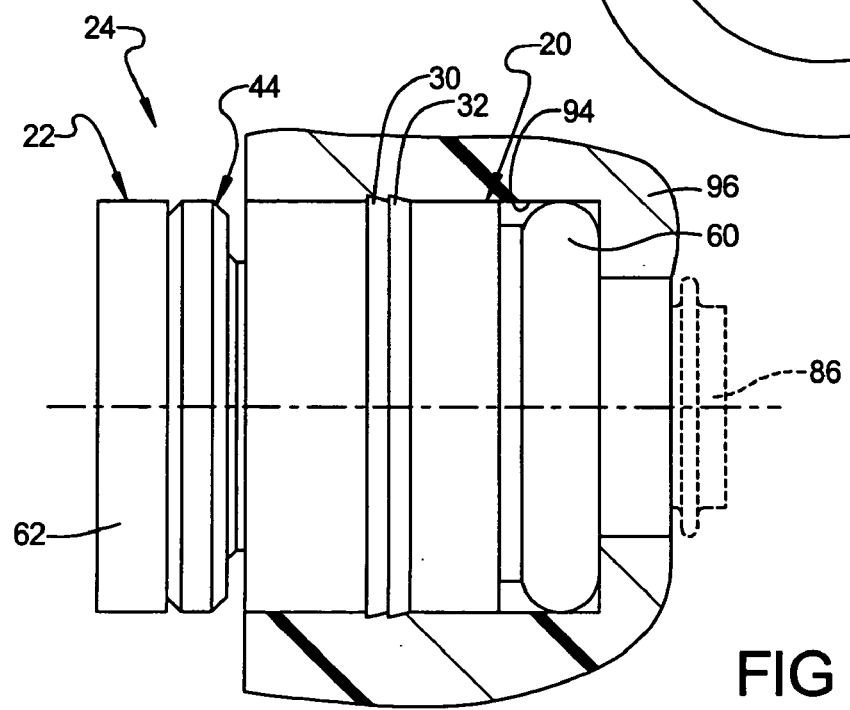
FIG. 3 is a side elevation view of the assembly of FIG. 1 installed in the port of a valve or manifold housing.

Referring now to FIG. 3, the quick-connect, cartridge-plug assembly 24 is shown mounted in a port 94 of a molded body 96 that functions as a housing for a valve or manifold. Body 96 may be made of a resinous material, which is substantially softer than the material comprising ring 26. Accordingly, assembly 24 is mounted within port 94 by a force fit in which ring 26 slides on the cylindrical surface of port 94 with the annular barbs 30, 32 on ring 26 preventing withdrawal of subassembly 20.

In accordance with the principles of the invention, plug 22 assists in the installation of subassembly 20 that includes ring 26 and collar 44, as well as annular seal 60, by retaining these components together on the tubular shank 76 as the components are mounted within port 94 of a valve or manifold. Optionally, tube support (dotted lines) 86 is retained within shank 76 and is inserted simultaneously with the subassembly 20 and annular seal 60 into port 94.

Figure 4B:
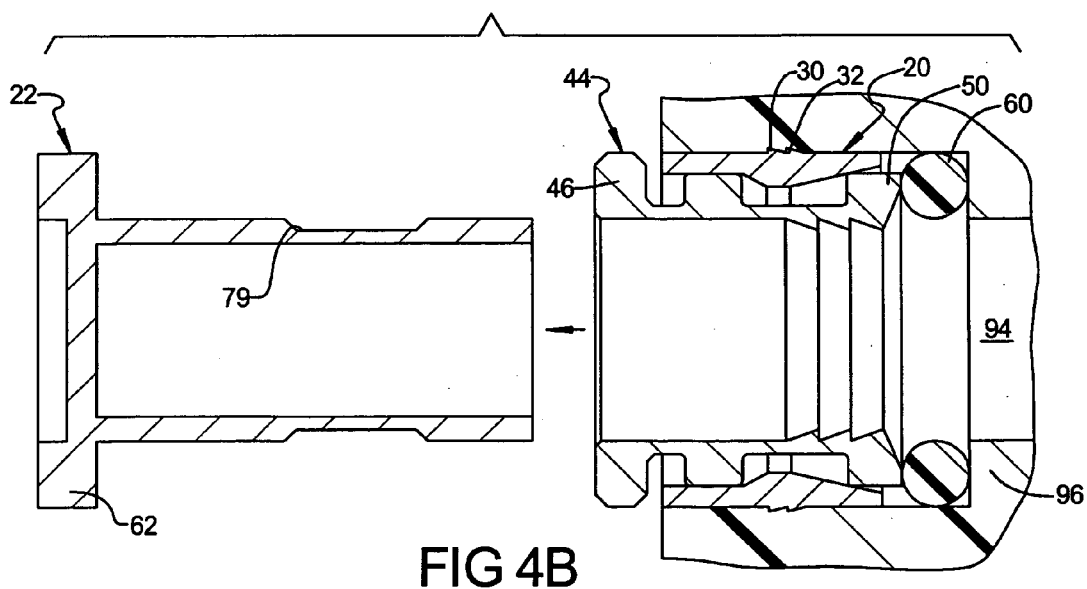
FIG. 4B is a cross-section view of FIG. 3, showing the plug after removal from the assembly.

Referring now to FIGS. 3–4B, it is seen that after subassembly 20 and annular seal 60 are inserted in port 94, plug 22 is withdrawn. This is accomplished using tool 61, which is inserted between flange 62 and flange 46. The extent to which groove 79 extends beyond barbs 56 when plug 22 is fully inserted into collar 44, denoted by $L_1$ in FIG. 1, is generally equal to or larger than a length $L_2$ of tool 61. As noted above, tool 61 is permitted to be inserted between flange 62 and flange 46 due to the limited degree of generally unimpeded axial movement of plug 22 allowed by groove 79. In an embodiment, tool 61 may be used to pry plug 22 out of collar 44, such as, for example, by pivoting tool 61 within the gap provided between flange 62 and flange 46.

Referring now to FIG. 5, there is shown another embodiment in which a plug 100 has an opening 102 through the front end thereof. The opening 102 can be closed by a dust plug 104 during shipping after being used in the same way as plug 22 of FIG. 3 to mount the subassembly 20 and O-ring 60. With the embodiment of FIG. 5, opening 102 allows the installer of the assembly to test the assembly prior to shipment. This may be accomplished by inserting a conical nozzle (not shown) in opening 102 after the assembly has been installed in the port 94, and applying pressurized fluid to test the valve or other element in the body. After the test is conducted, dust plug 104 is inserted to close the port and the manifold or valve is shipped. Thereafter, plug 100 is withdrawn in the same manner as the plug 22 is withdrawn (see, e.g., FIG. 4).

As will be appreciated, plug 22 (and 100) is used to keep a quick-connect cartridge, such as an "air brake quick-connect cartridge," together as an assembly during shipping. Plug 22 can then be used to install the cartridge assembly 20 into the ports of manifolds, fittings and valves. By having a plug 22 configured as described, the plug easily and accurately locates the cartridge subassembly 20, annular seal 60 and tube support 86 during installation. Subsequent to installing subassembly 20 and annular seal 60, plug 22 remains in the port as a dust plug during shipping of the manifold or valve, or the plug can be used as a seal for spare ports that may be optionally unplugged at final assembly depending on the application. Additionally, as set forth in FIG. 5, plug 100 may be configured with an opening 102 therethrough that facilitates testing, wherein opening 102 is sealed with a dust plug 104 for shipping of the valve or manifold in which the subassembly is used.

Referring to FIGS. 6–9, additional embodiments of the present invention are shown. In the embodiment illustrated in FIG. 6, a cartridge assembly 24a is shown that is substantially similar to cartridge assembly 24 shown in FIG. 1 with at least one exception, namely, flange 46 in collar 44 includes a step 106 with a radial surface 108. End flange 62 in plug 22 abuts flange 46 in collar 44 when plug 22 is received in subassembly 20. As described above, plug 22 is withdrawn after subassembly 20 and annular seal 60 are inserted into port 94. This is accomplished by a tool (e.g., tool 61) that grips the back side of flange 62 in the space created by step 106 in flange 46 between the backside of flange 62 and radial surface 108.

In another embodiment shown in FIGS. 7–9, a cartridge assembly 24b is shown that is substantially similar to cartridge assembly 24 shown in FIG. 1 with at least one exception, namely, flange 62 in plug 22 includes a chamfer 110 facing flange 46 of collar 44. Chamfer 110 may be defined, for example, by a generally linear and tapered surface 112, as shown in FIGS. 7 and 8, a radiused edge 114, as shown in FIG. 9, or another surface that provides for a space between flange 62 in plug 22 and flange 46 in collar 44. As shown in FIGS. 8 and 9, a chamfer 116 may also be provided in flange 46 for use alone or in combination with chamfer 110 in flange 60.

Figure 10:
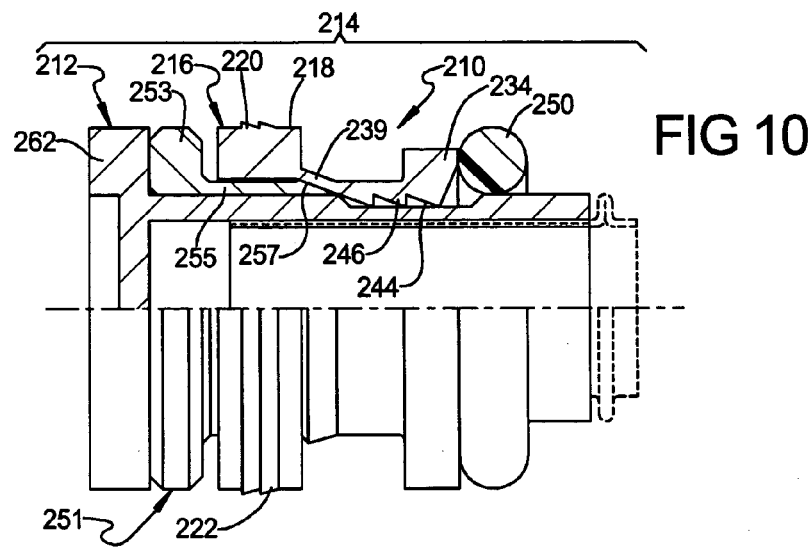
FIG. 10 is a partial cross-sectional view of a quick-connect cartridge assembly according to another embodiment of the invention.
Figure 11:
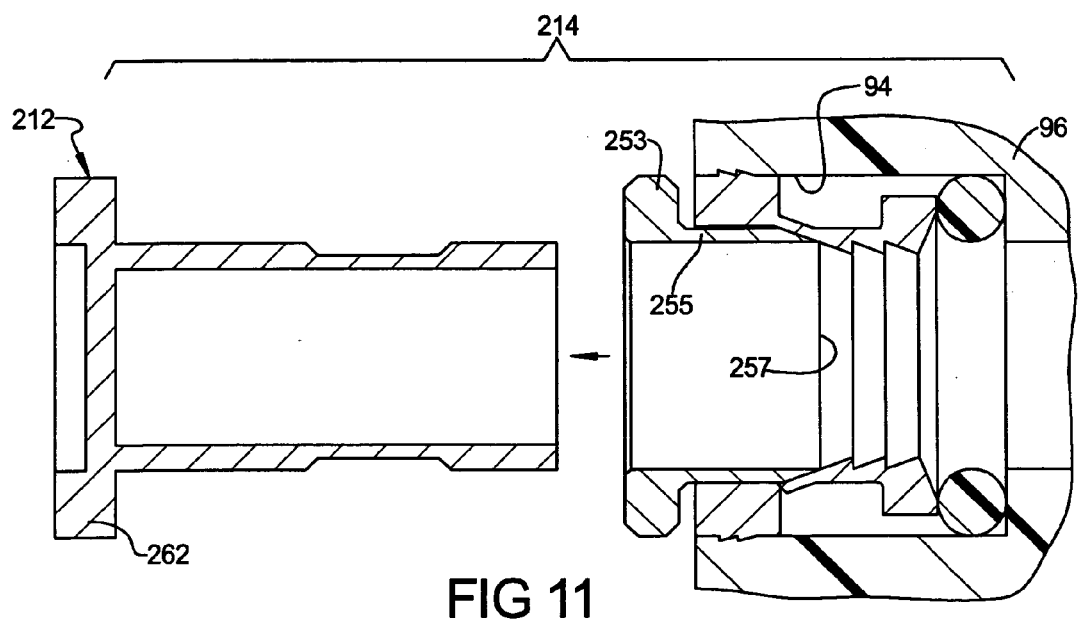
FIG. 11 is a cross-section view of FIG. 10, but showing the plug removed from the assembly.

Referring to FIGS. 10 and 11, another embodiment of the present invention is shown. In this embodiment, a cartridge subassembly 210 is shown with a plug 212, which cooperatively form a cartridge assembly 214. Cartridge subassembly 210 includes an outer ring 216 having an outer surface 218 with a pair of externally facing annular barbs 220 and 222 thereon. Integral with ring 216 is a collar 234 positioned coaxial therewith. Between ring 216 and collar 234 is an intermediate member 239 that secures collar 234 to ring 216. Collar 234 has an inner surface 244 that includes inwardly facing teeth or barbs 246.

Proximate ring 216 and collar 234 is a resilient annular seal 250, such as an O-ring, which abuts collar 234. Annular seal 250 has an outer diameter substantially similar to the outer diameter of ring 216 and an inner diameter substantially similar to the inner diameter of collar 234. Ring 216, collar 234 and annular seal 250 cooperate to provide a quick-connect cartridge 214, such as an air brake quick-connect cartridge, when inserted into a housing of a manifold, fitting or valve (see, e.g., FIG. 11).

In an embodiment of the invention, ring 216, collar 234 and annular seal 250 are mounted on a plug 212. Plug 212 is substantially similar to plug 22 shown in FIG. 1 and, for the sake of brevity, will not be further described. A cylindrical release member 251 is moveably disposed on plug 212 between plug 212 and ring 216. Release member 251 is generally defined by a radially outwardly extending flange 253 and a cylindrical sleeve 255 having a tapered tip 257.

Referring now to FIG. 11, it is seen that after subassembly 210 and annular seal 250 are inserted into port 94, plug 212 is withdrawn. This is accomplished by a tool (e.g., tool 61) that is inserted between flange 262 and flange 253 on release member 251. The tool is permitted to be inserted between flange 260 and flange 253 due to the limited degree of axial movement of release member 251 within ring 216 afforded by the groove in plug 212. Tapered tip 257 of release sleeve 255 may be used to engage and deflect intermediate member 239 and collar 234 outward allowing barbs 246 to become disengaged with plug 212. Once disengaged, plug 212 and release sleeve 251 may be removed from subassembly 210.

Figure 14:
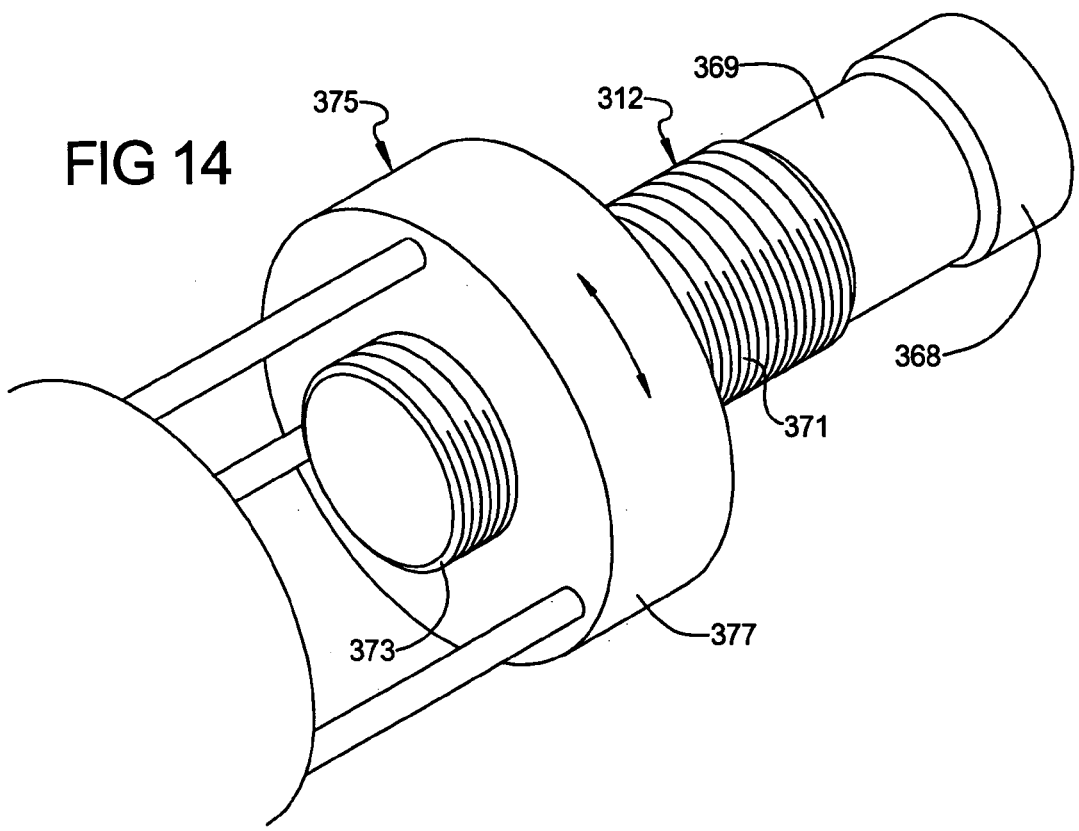
FIG. 14 is a perspective view of a tool used to remove the plug from the assembly shown in FIG. 12.

Referring to FIGS. 12–14, another embodiment of the present invention is shown. In this embodiment, a subassembly 310 is provided that is substantially similar to subassembly 20 described above. Subassembly 310 is mounted on a plug 312 for insertion into a port 94. In an embodiment, plug 312 includes a tubular shank portion 366 having an outer surface 368 that is friction-fit into a collar 334. Shank 366 is held within collar 334 by barbs 346, which extend inwardly from collar 334 and are received into an optional groove 369 projecting inwardly from outer surface 368 of shank 366. Unlike plug 22 describe above, plug 312 does not include a flange 62. Instead, plug 312 includes a threaded outer surface 371 that extends from groove 369 to a forward end 373 of plug 312. Threaded surface 371 is engaged by a tool 375, which in the illustrated embodiment is defined by a generally cylindrical drum 377 having an inner threaded surface 379.

Plug 312 assists in the installation of subassembly 310, which includes a ring 316 and collar 334 and annular seal 350, by retaining these components assembled on shank 366 as the components are mounted within port 94. Tool 375, particularly, drum 377 presses subassembly into port 94. Optionally, a tube support (dotted lines) 376 may be retained within shank 366 and is inserted simultaneously with subassembly 310 and annular seal 350 into port 94.

Referring now to FIG. 13, it is seen that after subassembly 310 and annular seal 350 are inserted in port 94, plug 312 may be withdrawn. This is accomplished by rotating tool 375 over plug 312 while drum 377 is pressed axially against a flange 336 of collar 334. During rotation of tool 375, plug 312 is prohibited from rotating due to its engagement with barbs 346 on collar 334. However, the interaction between the treaded surfaces of drum 377 and plug 312 force plug 312 to be moved axially out of collar 334 as drum 377 rotates. Alternatively, due to plug 312 being axially locked with drum 377 by the engagement of threads 371 and 379, plug 312 may be removed by moving tool 375 axially away from subassembly 310 without rotation. The embodiment of FIGS. 12–14 provides for more automated removal of plug 312.

Figure 15:
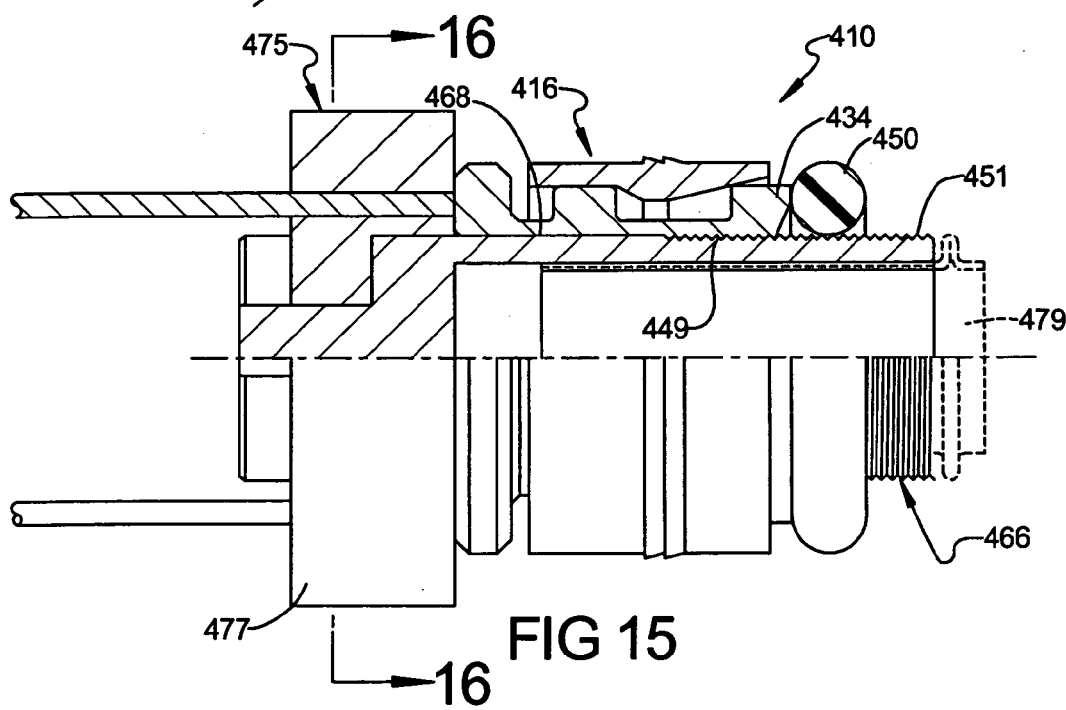
FIG. 15 is a partial cross-sectional view of a quick-connect cartridge assembly according to another embodiment of the invention.
Figure 16:
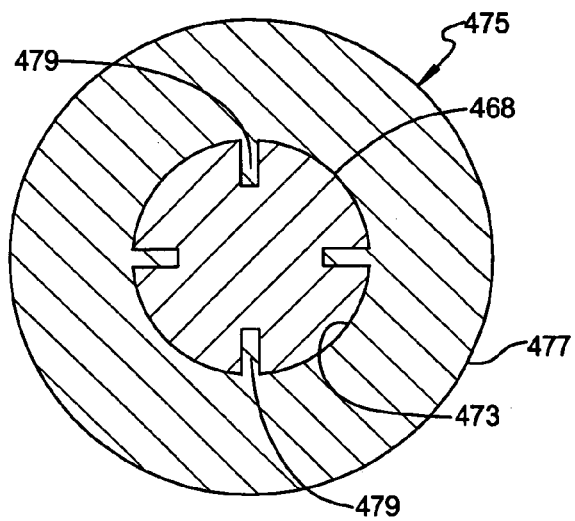
FIG. 16 is a cross-sectional view taken along line 16—16 in FIG. 15.
Figure 17:
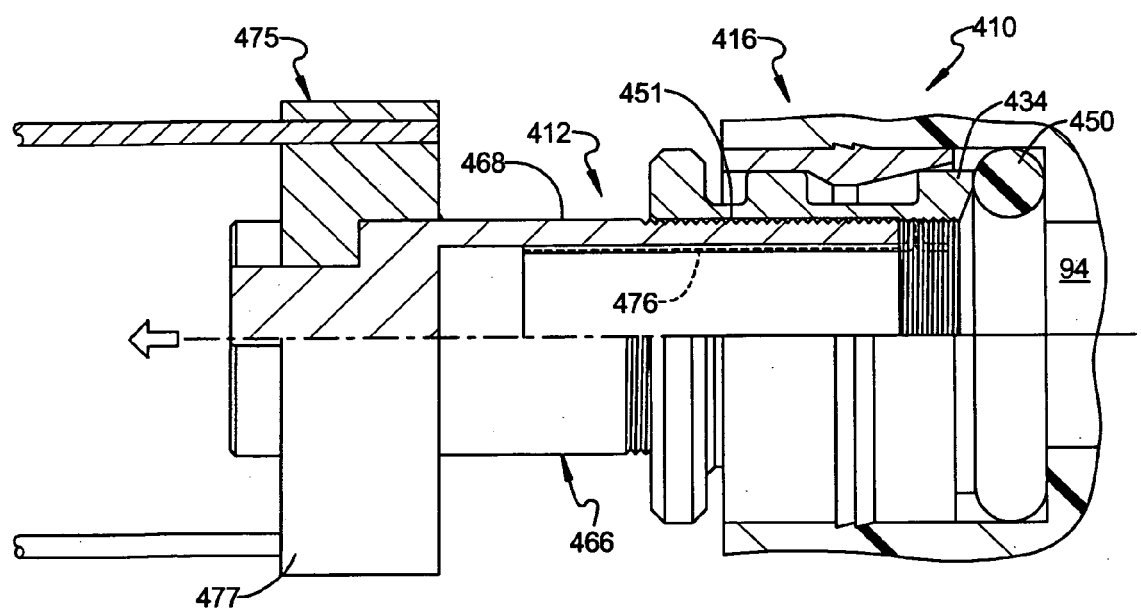
FIG. 17 is a cross-sectional view of the assembly of FIG. 15 shown during removal of the plug.

Referring to FIGS. 15–17, another embodiment of the present invention is shown. In this embodiment, a subassembly 410 is provided that is substantially similar to subassembly 20 described above. Subassembly 410 is mounted on a plug 412 for insertion into a port 94 (FIG. 17). In the illustrated embodiment, plug 412 includes a tubular shank portion 466 having an outer surface 468 threaded into a collar 434. Shank 466 is held within collar 434 by internal threads 449, which extend inwardly from collar 334 and are threaded onto outer threads 451 of plug 412. Unlike plug 22 described above, plug 412 does not include a flange 62. Instead, plug 412 includes a keyed outer surface 468 that engages a correspondingly keyed inner surface 473 of a tool 475. In an embodiment, tool 475 is defined by a generally cylindrical drum 477 having at least one inwardly directed tab 479 that slides onto plug 412 and locks plug 412 for rotation with tool 475.

As will be appreciated, plug 412 assists in the installation of subassembly 410, which includes a ring 416, collar 434 and an annular seal 450, by retaining these components assembled on tubular shank 466 as the components are mounted within port 94 of a valve or manifold. Tool 475, particularly drum 477, axially pushes subassembly into port 94. Optionally, a tube support 476 (dotted lines) is retained within shank 466 and is inserted simultaneously with subassembly 410 and annular seal 450 into port 94.

Referring now to FIG. 17, it is seen that after subassembly 410 and annular seal 450 are inserted into port 94, plug 412 may be withdrawn. This is accomplished by rotating tool 475 and plug 412. The interaction between treaded surface 449 on collar 434 and threaded surface 451 on plug 412 forces plug 412 to be moved axially out of collar 434 as drum 477 rotates.

Alternatively, as described above in reference to plug 22 shown in FIG. 2, plug 412 may include a cavity (e.g., cavity 74) surrounded by a raised portion, which serves to assist in locating a punch or other tool used to drive plug 412 and cartridge subassembly 410 during insertion into a port of a manifold or valve. As noted above, cavity may be defined by a geometric shape other than the generally round shape shown in FIG. 2, such as a rectangle or a polygonal. When so configured, the tool used to drive plug 412 and cartridge subassembly 410 into the port may also be used to rotate plug 412 out of cartridge subassembly 410.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A quick-connect cartridge assembly, comprising:
a ring;
a collar disposed within the ring, the collar having a predetermined inner diameter;
an annular seal coaxially disposed with respect to the ring and the collar;
a plug having a shank with an outer diameter substantially similar to the inner diameter of the collar,
wherein the shank of the plug is slidably received within the collar and is held within the collar by a friction fit,
the plug also being received through the annular seal so as to establish a coaxial relationship with the ring, the collar and the annular seal,
the plug including an end flange thereon for abutting the collar when the plug is inserted,
the end flange facilitating driving of the ring, the collar and the annular seal into a port, and
wherein the plug and the collar are configured to permit a predetermined degree of axial movement therebetween when the plug is received in the collar such that a gap is created between the collar and the end flange of the plug for insertion of a release tool adapted to withdraw the plug from the ring, the collar and the annular seal when mounted in the port,
wherein the end flange of the plug lacks a notch configured to receive the release tool to facilitate removal of the plug from the ring, the collar and the annular seal when mounted in the port.

2. The quick-connect cartridge assembly of claim 1, wherein the shank is held within the collar by at least one barb that extends inwardly from the collar and is received into a groove projecting inwardly from an outer surface of the shank, the groove being longer than the length of the barb that extends into the groove by a length $L_1$ that is substantially equal to or greater than a length $L_2$ of the tool.

3. The quick-connect cartridge assembly of claim 1, further including a release tool having a portion adapted to be received between the end flange and the collar,
wherein the shank is held within the collar by at least one barb that extends inwardly from the collar and is received into a groove projecting inwardly from an outer surface of the shank, the groove being longer than the length of the barb that extends into the groove by a length $L_1$ that is substantially equal to or greater than a length $L_2$ of the tool.

4. The quick-connect cartridge assembly of claim 1, wherein the collar includes a front flange, the end flange of the plug contacts the front flange of the collar in a first position and is removed from the front flange in a second position a distance that enables the tool to be inserted therebetween.

5. The quick-connect cartridge assembly of claim 1, wherein the ring includes an outer surface with at least one externally facing annular barb.

6. A quick-connect cartridge assembly for insertion into a port, the quick-connect cartridge assembly comprising:
 a ring;
 a collar at least partially disposed within the ring, the collar including a predetermined inner diameter and a barb portion having at least one inwardly extending barb;
 a plug including an end flange and a shank having an outer diameter substantially similar to the inner diameter of the collar, such that the shank is slidably received within the collar, the shank having an outer surface with a groove projecting inwardly therefrom such that the plug is held within the collar by the engagement of the barb into the groove in the shank, the groove having a greater length than the barb portion to permit a predetermined degree of axial movement of the plug relative to the collar to create a gap between the end flange of the plug and the collar; and
 an annular seal disposed about a portion of the shank adjacent to the collar;
 wherein the gap between the collar and the end flange of the plug permits a tool to be inserted therein to remove the plug from the ring, the collar, and the annular seal when the quick-connect cartridge assembly is inserted into the port,
 wherein the end flange of the plug lacks a step configured to receive the tool to facilitate removal of the plug from the ring, the collar and the annular seal when the quick-connect cartridge assembly is inserted into the port.

7. The quick-connect cartridge assembly of claim 6, wherein the ring is held within the port by at least one externally facing barb.

8. The quick-connect cartridge assembly of claim 6, wherein the ring has a predetermined outer diameter and the annular seal has an outer diameter substantially similar to the outer diameter of the ring.

9. The quick-connect cartridge assembly of claim 6, wherein the groove is longer than the length of the barb portion by a length $L_1$ that is substantially equal to or greater than a length $L_2$ of the tool.

10. The quick-connect cartridge assembly of claim 6, wherein the collar has a predetermined inner diameter and the annular seal has an inner diameter substantially similar to the inner diameter of the collar.

11. The quick-connect cartridge assembly of claim 6, wherein the collar includes a front flange at one end and a shoulder at the other end, wherein the front flange of the collar contacts the end flange of the plug and the shoulder of the collar contacts the annular seal when the quick-connect cartridge assembly is inserted into the port.

12. The quick-connect cartridge assembly of claim 6, wherein the end flange includes a cavity configured to assist in the insertion of the quick-connect cartridge assembly into the port.

13. The quick-connect cartridge assembly of claim 6, wherein the end flange is axially movable between a first position where it is in contact with the collar and a second position where it is spaced from the collar a distance that enables the tool to be inserted between the end flange and the collar.

14. The quick-connect cartridge assembly of claim 6, wherein a tube support is retained within the shank.

15. A quick-connect cartridge assembly for insertion into a port, the quick-connect cartridge assembly comprising:
 a cartridge subassembly including a ring, a collar at least partially disposed within the ring and including a barb portion having at least one inwardly extending barb, and an annular seal coaxially disposed with respect to the ring and the collar; and
 a plug having an end flange and a shank, the shank being slidably received within the collar and the through the annular seal to establish a coaxial relationship between the plug and the cartridge subassembly, the shank having an outer surface with a groove projecting inwardly therefrom such that the plug is held within the collar by the engagement of the barb into the groove in the shank, the groove having a greater length than the barb portion to permit a predetermined degree of axial movement of the plug relative to the collar to create a gap between the end flange of the plug and the collar,
 wherein the gap between the end flange of the plug and the collar permits a tool to be inserted therein to remove the plug from the cartridge subassembly when the plug and the cartridge subassembly are inserted into the port,
 wherein the end flange of the plug lacks a notch configured to receive the tool to facilitate removal of the plug from the cartridge subassembly when the cartridge subassembly is inserted into the port.

16. The quick-connect cartridge assembly of claim 15, wherein the ring is held within the port by at least one externally facing barb.

17. The quick-connect cartridge assembly of claim 15, wherein the ring has a predetermined outer diameter and the annular seal has an outer diameter substantially equal to the outer diameter of the ring.

18. The quick-connect cartridge assembly of claim 15, wherein the collar has a predetermined inner diameter and the annular seal has an inner diameter substantially equal to the inner diameter of the collar.

19. The quick-connect cartridge assembly of claim 15, wherein the groove is longer than the length of the barb portion by a length $L_1$ that is substantially equal to or greater than a length $L_2$ of the tool.

20. The quick-connect cartridge assembly of claim 15, wherein the end flange is axially movable between a first position where it is in contact with the collar and a second position where it is spaced from the collar a distance that enables the tool to be inserted between the end flange and the collar.

* * * * *